(12) United States Patent
Chen et al.

(10) Patent No.: US 11,661,788 B2
(45) Date of Patent: May 30, 2023

(54) HEAT-ASSISTED RECORDING HEAD HAVING SUB WAVELENGTH MIRROR FORMED OF FIRST AND SECOND MATERIALS

(71) Applicant: Seagate Technology LLC, Fremont, CA (US)

(72) Inventors: Weibin Chen, Edina, MN (US); Nan Zhou, Chanhassen, MN (US); Ruoxi Yang, Plymouth, MN (US); Michael Allen Siegler, Eden Prairie, MN (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 17/583,550

(22) Filed: Jan. 25, 2022

(65) Prior Publication Data

US 2022/0220795 A1     Jul. 14, 2022

Related U.S. Application Data

(63) Continuation of application No. 17/216,017, filed on Mar. 29, 2021, now Pat. No. 11,264,053, which is a continuation of application No. 16/855,047, filed on Apr. 22, 2020, now Pat. No. 10,964,340.

(60) Provisional application No. 62/839,863, filed on Apr. 29, 2019.

(51) Int. Cl.
| | |
|---|---|
| *G11B 5/00* | (2006.01) |
| *G11B 11/105* | (2006.01) |
| *E06B 1/62* | (2006.01) |
| *C08L 95/00* | (2006.01) |
| *E04B 1/66* | (2006.01) |
| *E04F 19/04* | (2006.01) |

(52) U.S. Cl.
CPC .............. *E06B 1/62* (2013.01); *C08L 95/005* (2013.01); *E04B 1/665* (2013.01); *E04F 19/045* (2013.01); *E04F 19/0459* (2013.01); *E06B 2001/628* (2013.01)

(58) Field of Classification Search
CPC ... G11B 5/4866; G11B 5/3133; G11B 5/3169; G11B 5/3906; G11B 5/6088; G11B 7/135; G11B 7/22; G11B 2005/0021; G11B 11/105; G11B 5/127; G11B 1/125
USPC .......................................................... 360/59
See application file for complete search history.

(56) References Cited

U.S. PATENT DOCUMENTS

| | | |
|---|---|---|
| 7,596,072 B2 | 9/2009 | Buechel et al. |
| 8,755,118 B2 | 6/2014 | Chang-Hasnain et al. |
| 9,852,753 B2 | 12/2017 | Peng |
| 9,911,441 B1 | 3/2018 | Jandric et al. |

(Continued)

*Primary Examiner* — Nabil Z Hindi
(74) *Attorney, Agent, or Firm* — Mueting Raasch Group

(57) ABSTRACT

A recording head has a near-field transducer that extends a first distance away from a media-facing surface. Two subwavelength focusing mirrors are at an end of a waveguide proximate the media-facing surface and extend a second distance away from the media-facing surface that is less than the first distance. The subwavelength mirrors are on opposite crosstrack sides of the near-field transducer and separated from each other by a crosstrack gap. The subwavelength focusing mirrors each include a first material at the media-facing surface and a plasmonic material that covers an edge of the subwavelength focusing mirror that faces the near-field transducer. The first material is more mechanically robust than the plasmonic material.

20 Claims, 11 Drawing Sheets

(56) References Cited

U.S. PATENT DOCUMENTS

| | | |
|---|---|---|
| 9,934,800 B1 | 4/2018 | Neira et al. |
| 10,068,596 B2 * | 9/2018 | Staffaroni ............. G11B 5/3116 |
| 10,115,423 B1 | 10/2018 | Gubbins et al. |
| 10,249,326 B1 | 4/2019 | Peng |
| 10,360,939 B2 * | 7/2019 | Krichevsky ............ G11B 5/127 |
| 10,964,340 B1 | 3/2021 | Chen et al. |
| 2006/0133230 A1 | 6/2006 | Buechel et al. |
| 2013/0058370 A1 | 3/2013 | Chang-Hasnain et al. |
| 2017/0249962 A1 * | 8/2017 | Peng .................... G11B 5/6088 |
| 2021/0249039 A1 | 8/2021 | Chen et al. |

* cited by examiner

HEAT-ASSISTED RECORDING HEAD HAVING SUB WAVELENGTH MIRROR FORMED OF FIRST AND SECOND MATERIALS

RELATED PATENT APPLICATIONS

This application is a continuation of U.S. patent application Ser. No. 17/216,017, filed on Mar. 29, 2021, which is a continuation of U.S. patent application Ser. No. 16/855,047 filed on Apr. 22, 2020, issued as U.S. Pat. No. 10,964,340 on Mar. 30, 2021, which claims the benefit of Provisional Patent Application Ser. No. 62/839,863 filed on Apr. 29, 2019, all of which are hereby incorporated herein by reference in their entireties.

SUMMARY

The present disclosure is directed to a heat-assisted recording head having subwavelength mirror formed of first and second materials. In various embodiments, a recording head has a near-field transducer proximate a media-facing surface of the recording head. The near-field transducer extends a first distance away from the media-facing surface. A waveguide overlaps and delivers light to the near-field transducer. Two subwavelength focusing mirrors are at an end of the waveguide proximate the media-facing surface and extend a second distance away from the media-facing surface that is less than the first distance. The subwavelength mirrors are on opposite crosstrack sides of the near-field transducer and separated from each other by a crosstrack gap. The subwavelength focusing mirrors each include a first material at the media-facing surface and a liner covering the first material at an edge of the subwavelength focusing mirror that faces the near-field transducer. The first material is more mechanically robust than a plasmonic material that forms the liner.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure is generally related to heat-assisted magnetic recording (HAMR), also referred to as energy-assisted magnetic recording (EAMR), thermally-assisted recording (TAR), thermally-assisted magnetic recording (TAMR), etc. In a HAMR device, a near-field transducer (NFT) concentrates optical energy into a tiny optical spot in a recording layer, which raises the media temperature locally, reducing the writing magnetic field required for high-density recording. A waveguide delivers light to the near-field transducer and excites the near-field transducer.

One challenge in developing in HAMR products involves wear of the optical components that can make impact life of the drives. One cause for this is separation of parts and voiding within regions surrounding the NFT. The optical components in this region are subject to high temperatures and may become oxidized, which can cause voiding or separation of some materials. A HAMR write transducer described below uses a subwavelength mirror that overlaps part of the NFT in an area near the air bearing surface (ABS), which may also be referred to herein as a media-facing surface. Generally, the subwavelength mirror has dimensions along its reflecting surface that are smaller than the wavelength of the incident light (e.g., 830 nm).

The subwavelength mirror focuses incident waveguide light onto the NFT to assist waveguide-NFT coupling. The subwavelength mirror also functions as an optical side shield to block background light. Therefore, the laser current used for writing can be reduced and thermal gradient improved. In order to obtain optimum optical performance, the mirror is made from a material such as Au that is a good optical and thermal characteristics. However, it has been found that Au and similar plasmonic materials are subject to degradation in the NFT region. Therefore, the present disclosure describes to additional features to increase robustness and durability of a subwavelength mirror.

Figure 1:
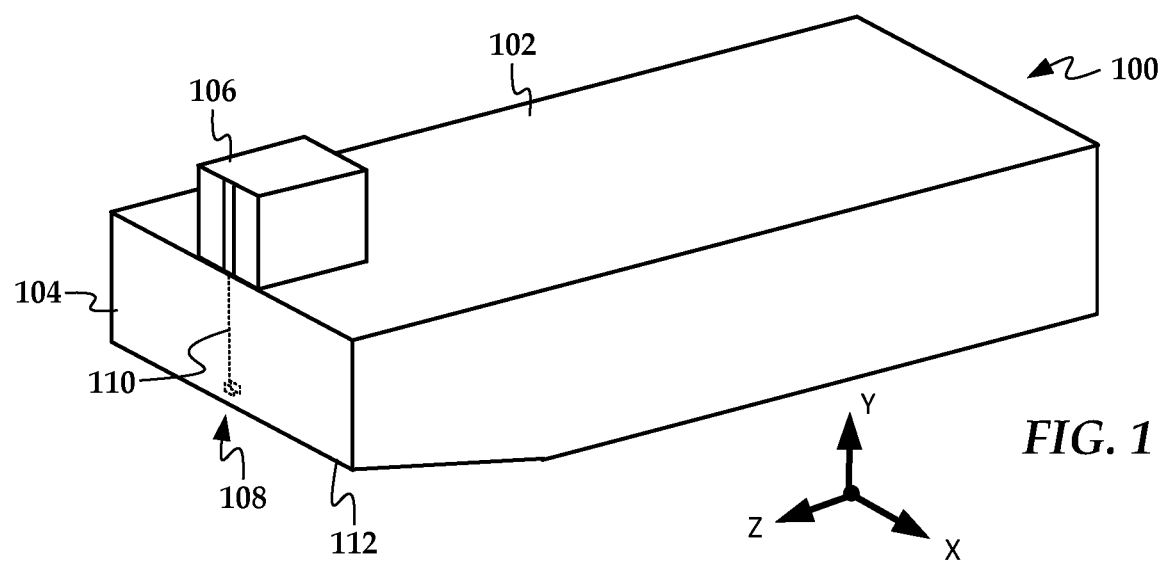
FIG. 1 is a perspective view of a slider assembly according to an example embodiment.

In reference now to FIG. 1, a perspective view shows a read/write head 100 according to an example embodiment. The read/write head 100 may be used in a magnetic data storage device, e.g., HAMR hard disk drive. The read/write head 100 may also be referred to herein interchangeably as a slider, head, write head, read head, recording head, etc. The read/write head 100 has a slider body 102 with read/write transducers 108 at a trailing edge 104 that are held proximate to a surface of a magnetic recording medium (not shown), e.g., a magnetic disk.

The illustrated read/write head 100 is configured as a HAMR device, and so includes additional components that form a hot spot on the recording medium near the read/write transducers 108. These HAMR components include an energy source 106 (e.g., laser diode) and a waveguide 110. The waveguide 110 delivers electromagnetic energy from the energy source 106 to a near-field transducer (NFT) that is part of the read/write transducers 108. The NFT achieves surface plasmon resonance and directs the energy out of a media-facing surface 112 to create a small hot spot in the recording medium.

Figure 2:
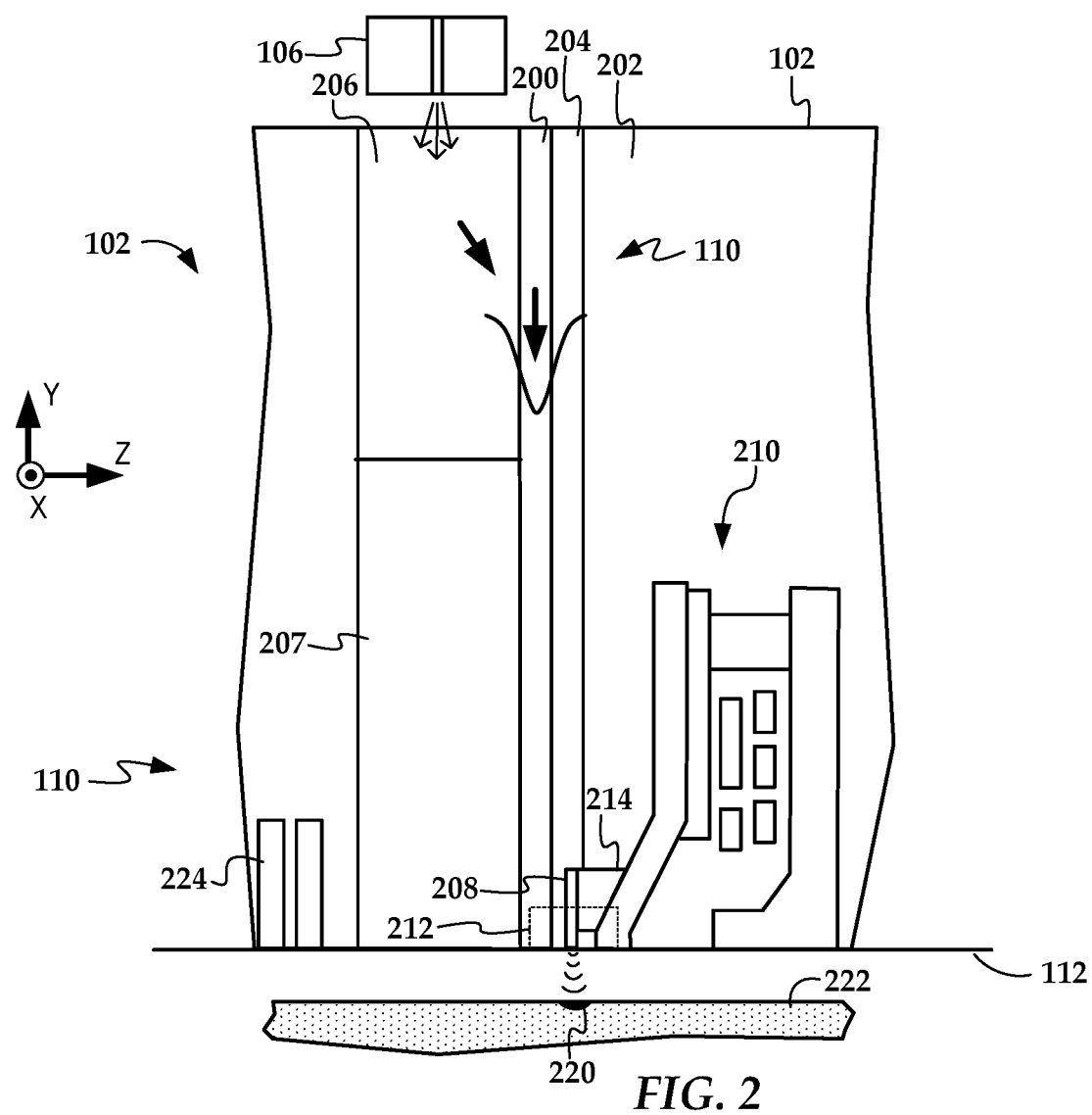
FIG. 2 is a cross-sectional view of a slider along a down-track plane according to according to an example embodiment.
Figure 3:
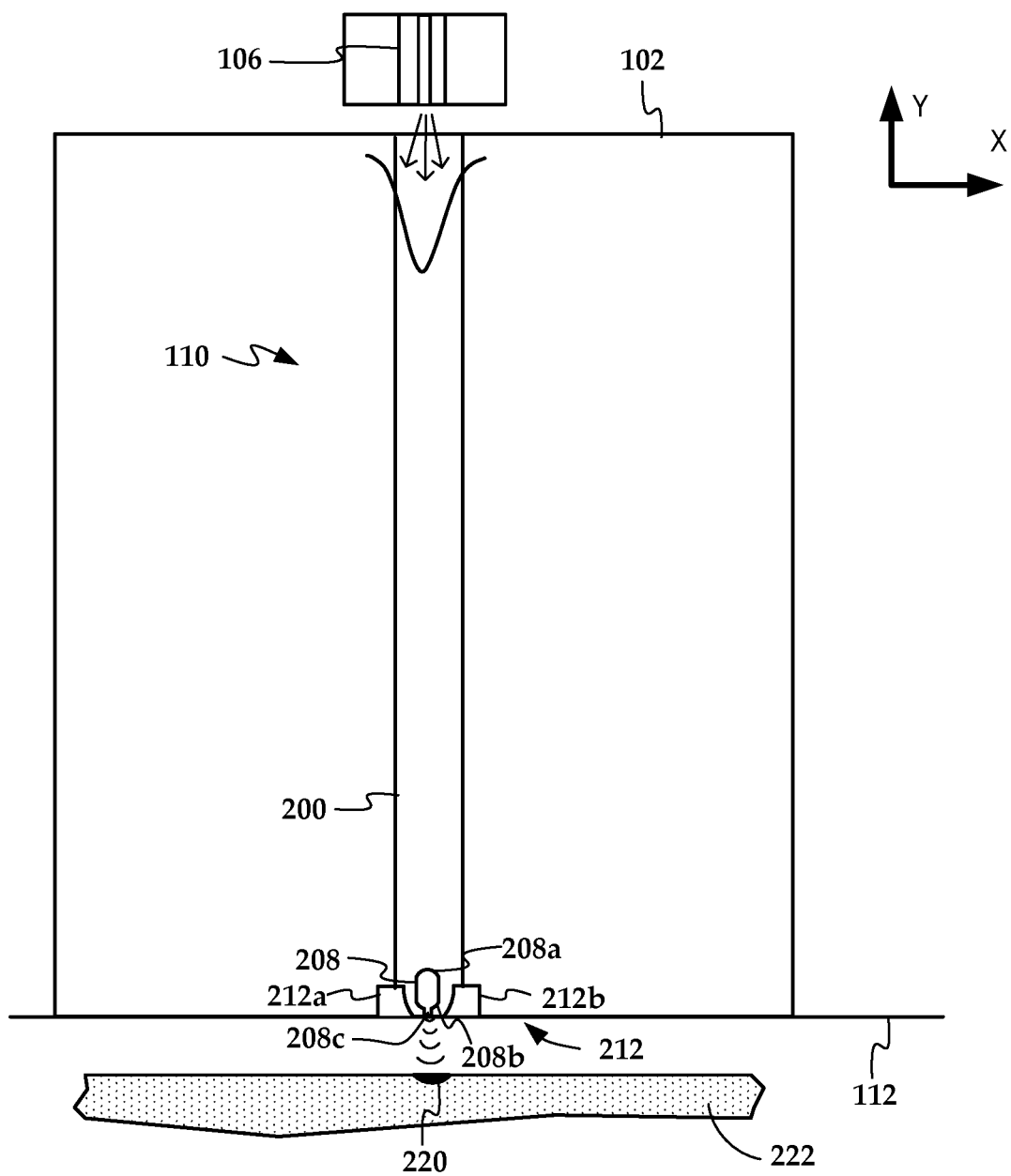
FIG. 3 is a wafer plane view of a slider according to an example embodiment.

In FIGS. 2 and 3, respective cross-sectional and wafer plane views of the slider body 102 show a light delivery system according to an example embodiment. The slider body includes an NFT 208, a magnetic writer 210 and a micro-sized focusing mirror 212, referred to herein as a subwavelength mirror, subwavelength focusing mirror, subwavelength solid immersion mirror (SIM), mini-SIM, etc. Light, emitting from the laser diode 106, is coupled into a three-dimensional, single mode channel waveguide 110 by a waveguide input coupler 206, which directs the light to a waveguide core 200. The input coupler 206 is replaced by a bottom cladding layer 207 towards the media-facing surface 112. Note that other waveguide and input coupler arrangements may be used with the NFT 208 and mirror 212.

The NFT 208 has an enlarged part with two curved ends 208*a-b* and a protruded peg 208*c*. Other shapes may be possible for the enlarged part of the NFT 208, e.g., rectangular, triangular. The NFT 208 is placed proximate a side cladding layer 204 and top cladding layer 202 of the waveguide 110 and near the waveguide core 200. The NFT 208 could be also placed into the waveguide core 200. The NFT 208 achieves plasmonic resonance in response to the light coupled via the waveguide 110, and creates a small hotspot 220 on a recording medium 222 during recording.

A magnetic reader 224 is shown down-track from the NFT 208 and writer 210. The magnetic reader 224 may include a magneto-resistive stack that changes resistance in response to changes in magnetic field detected from the recording medium 222. These changes in magnetic field are converted to data by a read channel of the apparatus (e.g., hard disk drive assembly).

As best seen in FIG. 3, the subwavelength mirror 212 includes reflective metallic portions 212*a-b* on either crosstrack of the NFT 208. The mirror portions 212*a-b* focus the incident waveguide light to the NFT 208 to assist in waveguide-NFT coupling. The mirror portions 212*a-b* can also function as optical side shields that block background light from exiting the media-facing surface 112. The subwavelength mirrors described below utilize combinations of soft plasmonic materials and hard materials that help improve performance and life of the recording head 100.

Figure 4:
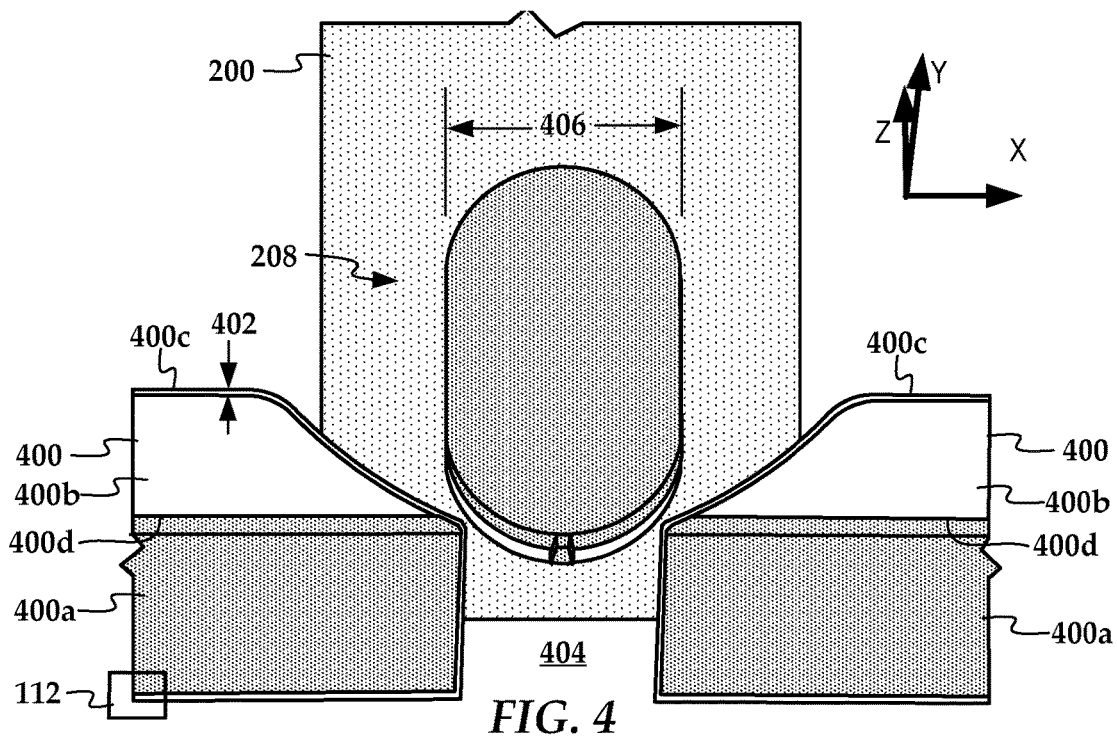
FIGS. 4 and 5 are perspective and plan views of a subwavelength mirror according to an example embodiment.
Figure 5:
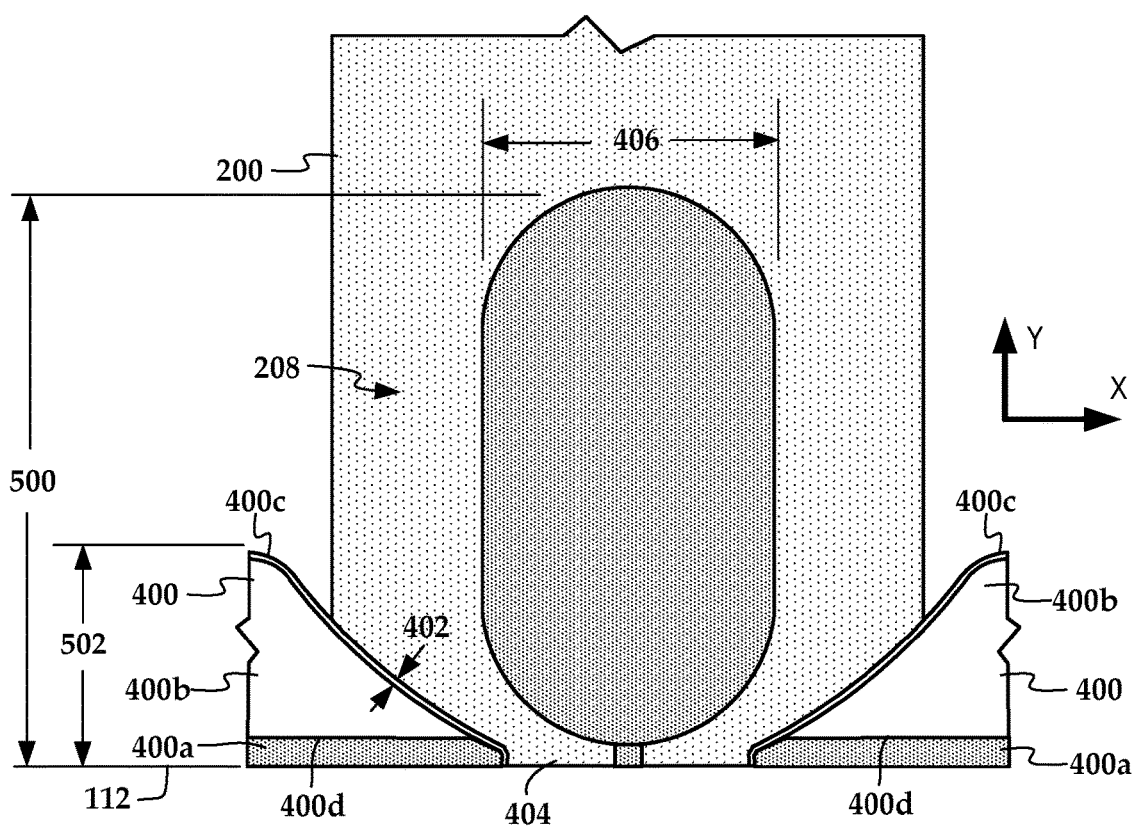

In FIGS. 4 and 5, diagrams illustrate details of a subwavelength mirror according to an example embodiment. The diagram in FIG. 4 is a perspective view seen from the media-facing surface 112 and the diagram in FIG. 5 is a plan view on a substrate-parallel plane. The subwavelength mirror includes a pair of subwavelength focusing mirrors 400 at an end of the waveguide 200 proximate the media-facing surface 112. The subwavelength focusing mirrors 400 are on opposite crosstrack sides of the near-field transducer 208 and separated from each other by a crosstrack gap 404. The width of crosstrack gap 404 may be less than a corresponding crosstrack width 406 of the NFT 208. As seen in FIG. 5, the near-field transducer 208 extends a first distance 500 away from the media-facing surface 112 and the mirrors 400 extend a second distance 502 away from the media-facing surface that is less than the first distance 500. For example, the second distance 502 may be less than half of the first distance 500.

Each of the subwavelength focusing mirrors includes a first material 400*a* at the media-facing surface 112 and a second material 400*b* (e.g., a plasmonic material) facing away from the media facing surface 112 and in contact with the first material 400*a*. In this example, an interface 400*d* between the first and second materials 400*a*, 400*b* is parallel with the media facing surface 112. In other embodiments, the interface between the first and second materials 400*a*, 400*b* may be at an angle to the media-facing surface 112. The first material 400*a* is more mechanically robust than the second material 400*b*. A liner 400*c* coats an edge of the subwavelength focusing mirrors that faces the near-field transducer 208. As seen here, the liner 400*c* covers both the first and second materials 400*a*, 400*b* and extends into the gap 404.

The second material 400*b* and liner 400*c* may include the same or different material. The second material 400*b* (and optionally the liner 400*c*) may be a plasmonic material with good optical characteristics such as Au, Ag, Cu, Al or their alloys. In some embodiments, the liner 400*c* can be made of hard material, such as Rh, Ir, Pt, Pd, Ru, or their alloys. The hard, first material 400*a* is presented at the media-facing surface 112 for ABS protection and design robustness, and may include such materials as Rh, Ir, Pt, Pd, Ru, or their alloys. The soft plasmonic materials 400*b*, 400*c* are inside the media-facing surface 112 for better optical coupling and thermal conduction. The liner thickness 402 may be from 1 nm to 25 nm.

Figure 6:
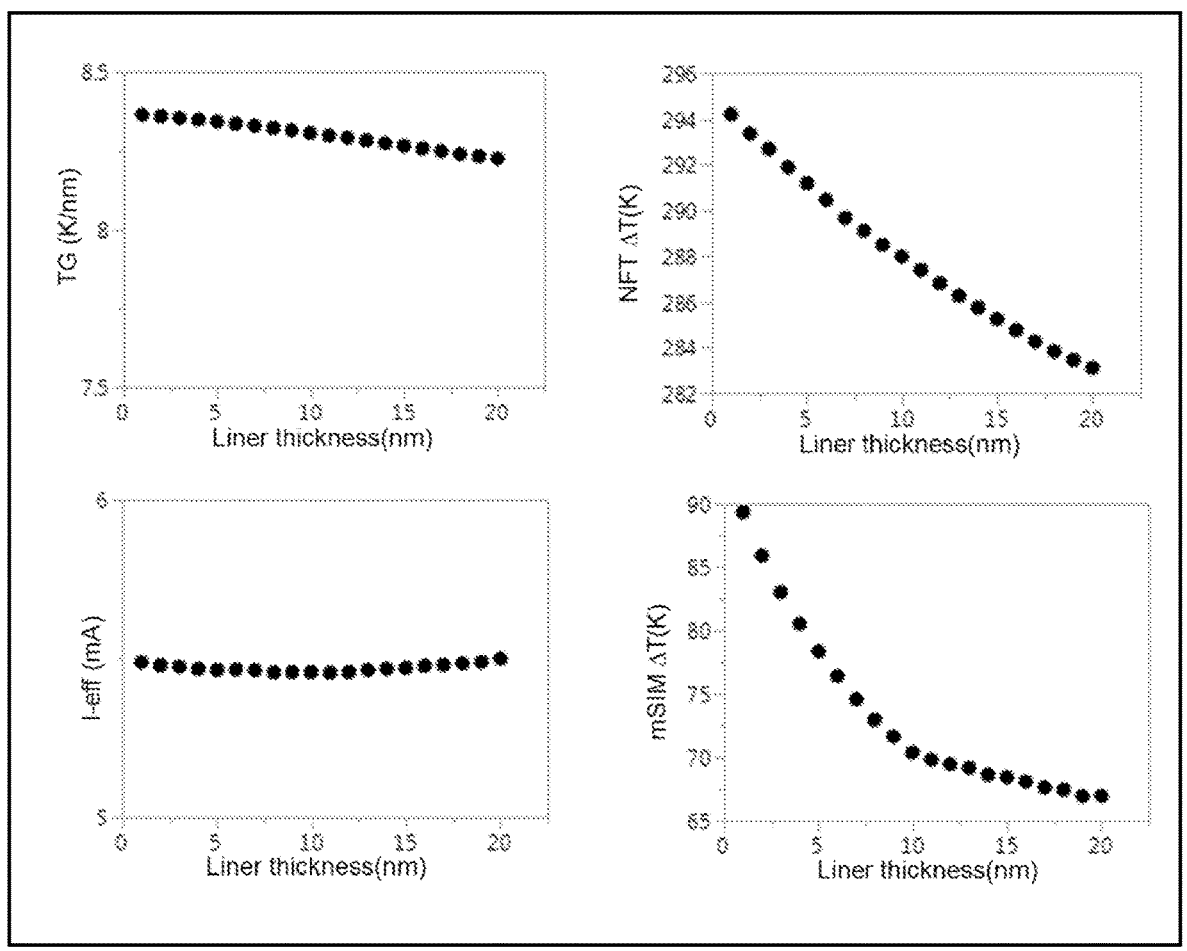
FIGS. 6 and 7 are sets of graphs showing simulation results of the arrangement shown in FIGS. 4 and 5.
Figure 7:
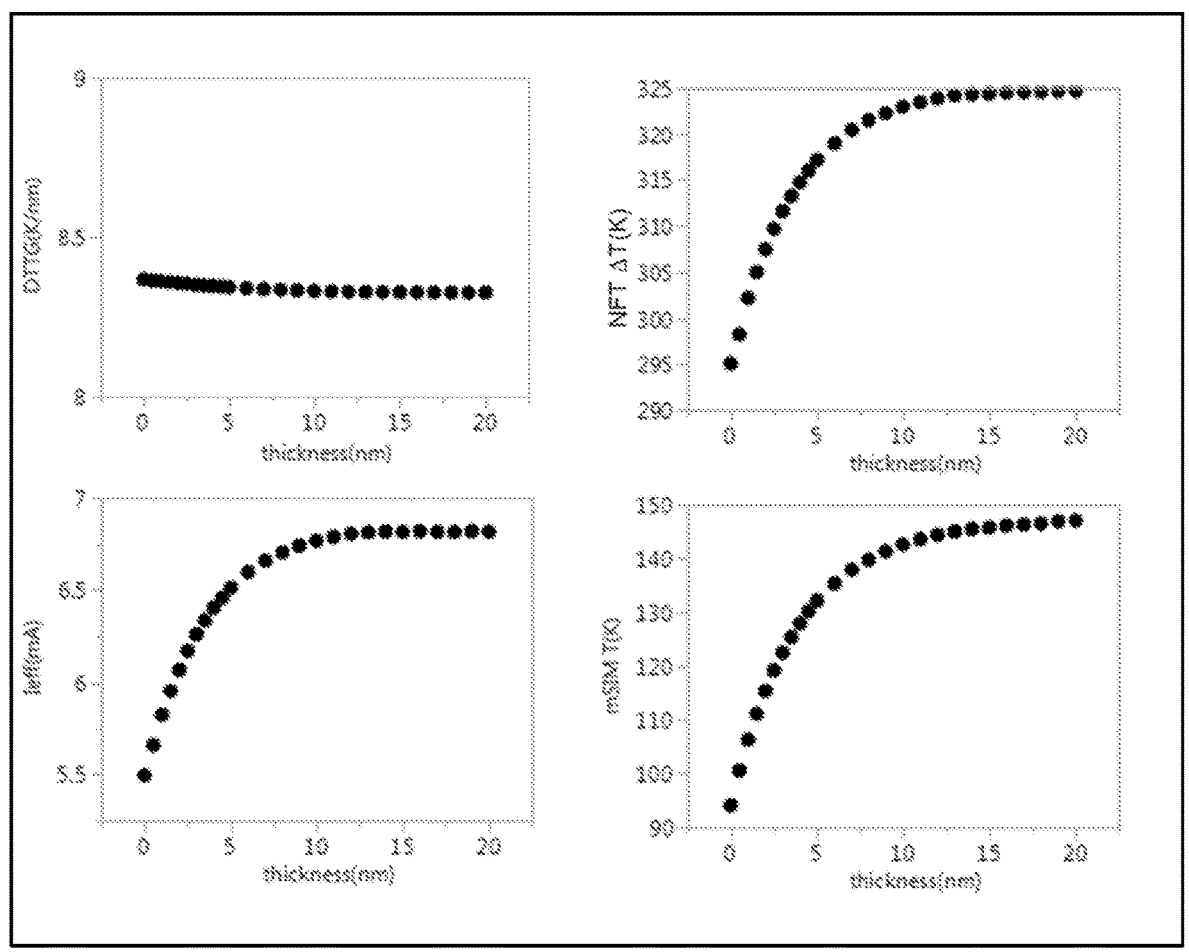

In FIGS. 6 and 7, a set of graphs show results of an analysis performed on the mirror arrangement shown in FIGS. 4 and 5 with a liner 400*c* formed of a soft plasmonic material, Au, Ag, Cu, Al or their alloys. There is a slight drop in thermal gradient (TG) with thicker soft plasmonic liner. The NFT temperature (NFT $\Delta T$) and mirror temperatures (mSIM $\Delta T$) drop with a thicker soft plasmonic liner 400*c*. The liner thickness 402 has little impact on laser current (Ieff). In FIG. 7, a set of graphs show an analysis performed on the mirror arrangement shown in FIGS. 4 and 5 with a liner 400*c* formed of a hard material, such as Rh, Ir, Pt, Pd, Ru, or their alloys. The NFT and mirror temperatures go up with thicker hard material liner 400*c*, as does the required laser current. Though the temperature is higher in this case, this design may have better robustness than one with a softer plasmonic material liner 400*c*.

Figure 8:
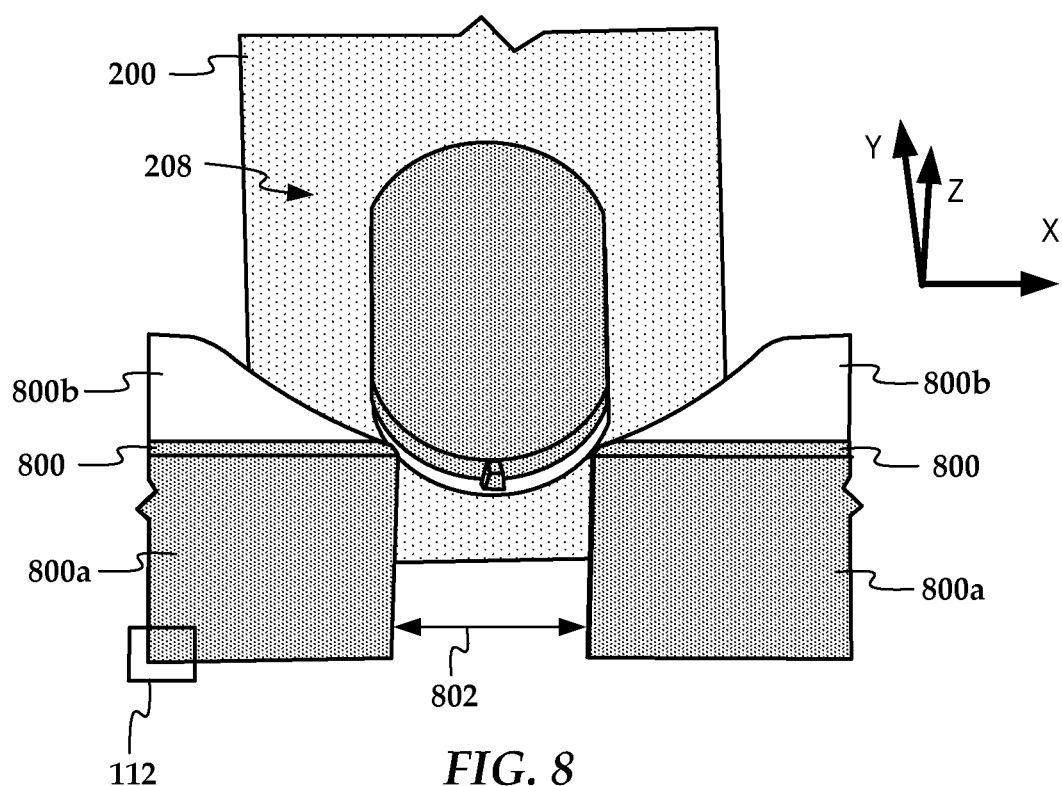
FIGS. 8 and 9 are perspective and plan views of a subwavelength mirror according to another example embodiment.
Figure 9:
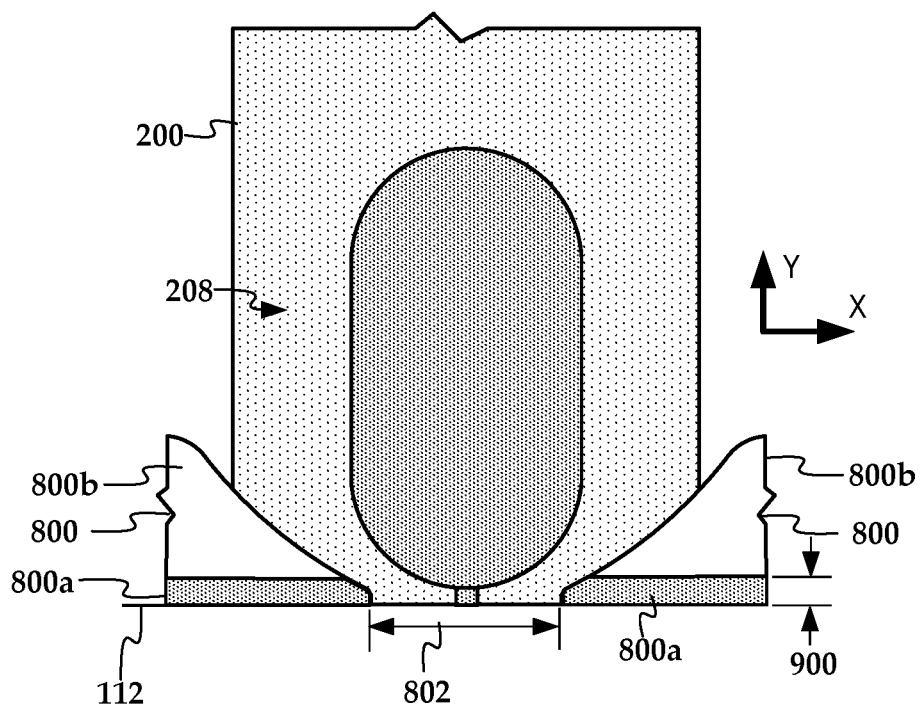

In FIGS. 8 and 9, diagrams illustrate details of a subwavelength mirror according to another example embodiment. The diagram in FIG. 8 is a perspective view seen from the media-facing surface 112 and the diagram in FIG. 9 is a plan view on a substrate-parallel plane. The subwavelength mirror includes a pair of subwavelength focusing mirrors 800 at an end of the waveguide 200 proximate the media-facing surface 112. Each of the subwavelength focusing mirrors includes a first material 800*a* at the media-facing surface 112 and a second material 800*b* facing away from the media facing surface and in contact with the first material 800*a*. The first material 800*a* is more mechanically robust than the second material 800*b*. This embodiment has no liner comparable to what is shown in FIGS. 4 and 5.

The second material 800*b* may include a plasmonic material with good optical characteristics such as Au, Ag, Cu, Al or their alloys. The hard, first material 800*a* is presented at the media-facing surface 112 for ABS protection and design robustness, and may include such materials as Rh, Ir, Pt, Pd, Ru, or their alloys. In other embodiments, the first material 800*a* may be ceramic materials as ZrN, TiN, etc., or a magnetic material such as Fe, Ni, NiFe, FeCo, or alloys thereof. The soft plasmonic material 800*b* is inside the media-facing surface 112 for better optical coupling and thermal conduction.

Figure 10:
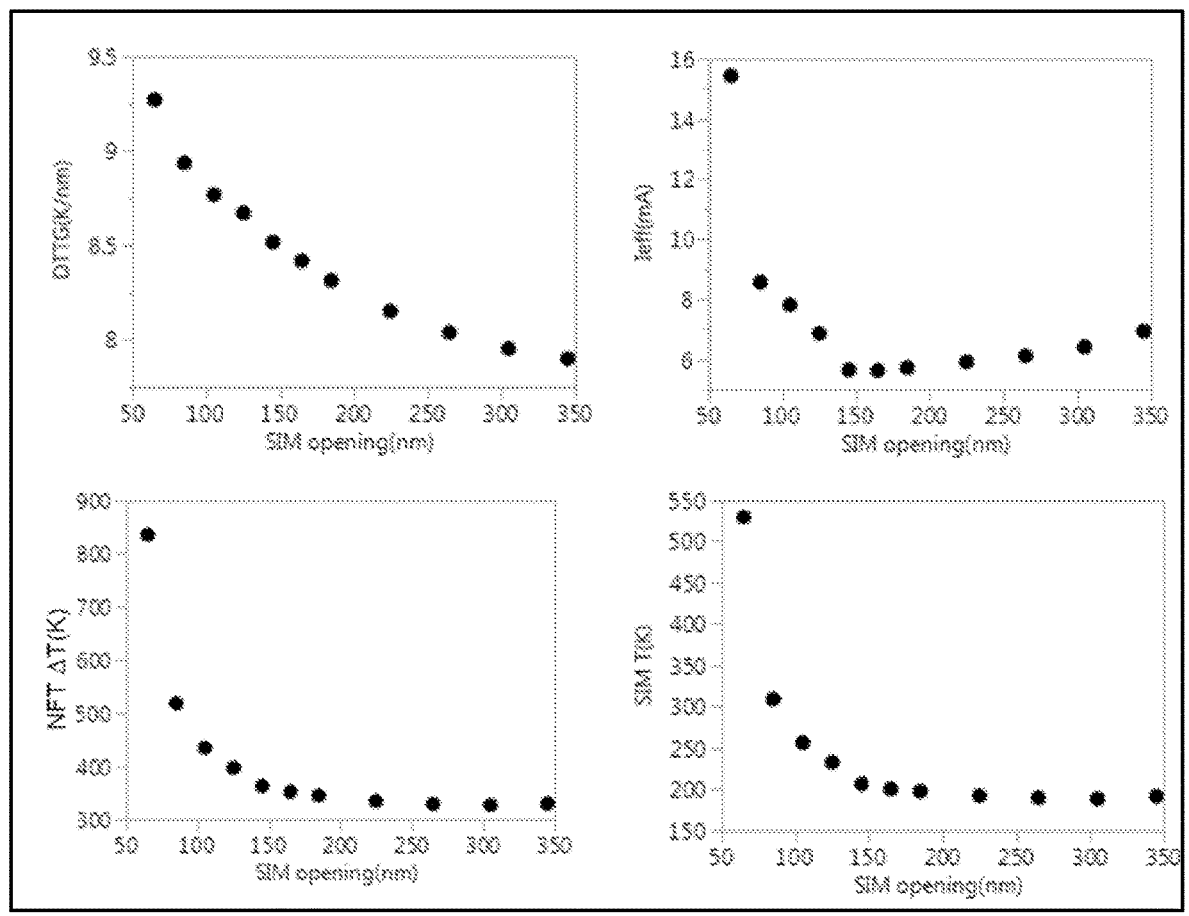
FIGS. 10 and 11 are sets of graphs showing simulation results of the arrangement shown in FIGS. 8 and 9.

One parameter that can affect performance of this and other embodiments is the crosstrack gap 802 opening between the mirrors 800. In FIG. 10, a set of graphs show results of a simulation using various values of the gap 802 (labeled "SIM opening" in the graphs). These graphs generally show a higher downtrack thermal gradient (DTTG) with a narrower opening. The NFT and mirror temperature will increase if that gap 802 is too small, and laser current will also increase for a smaller gap 802. These gap dimensions may also be used for embodiments with a liner as shown in FIGS. 4 and 5, as well as embodiments described below.

Figure 11:
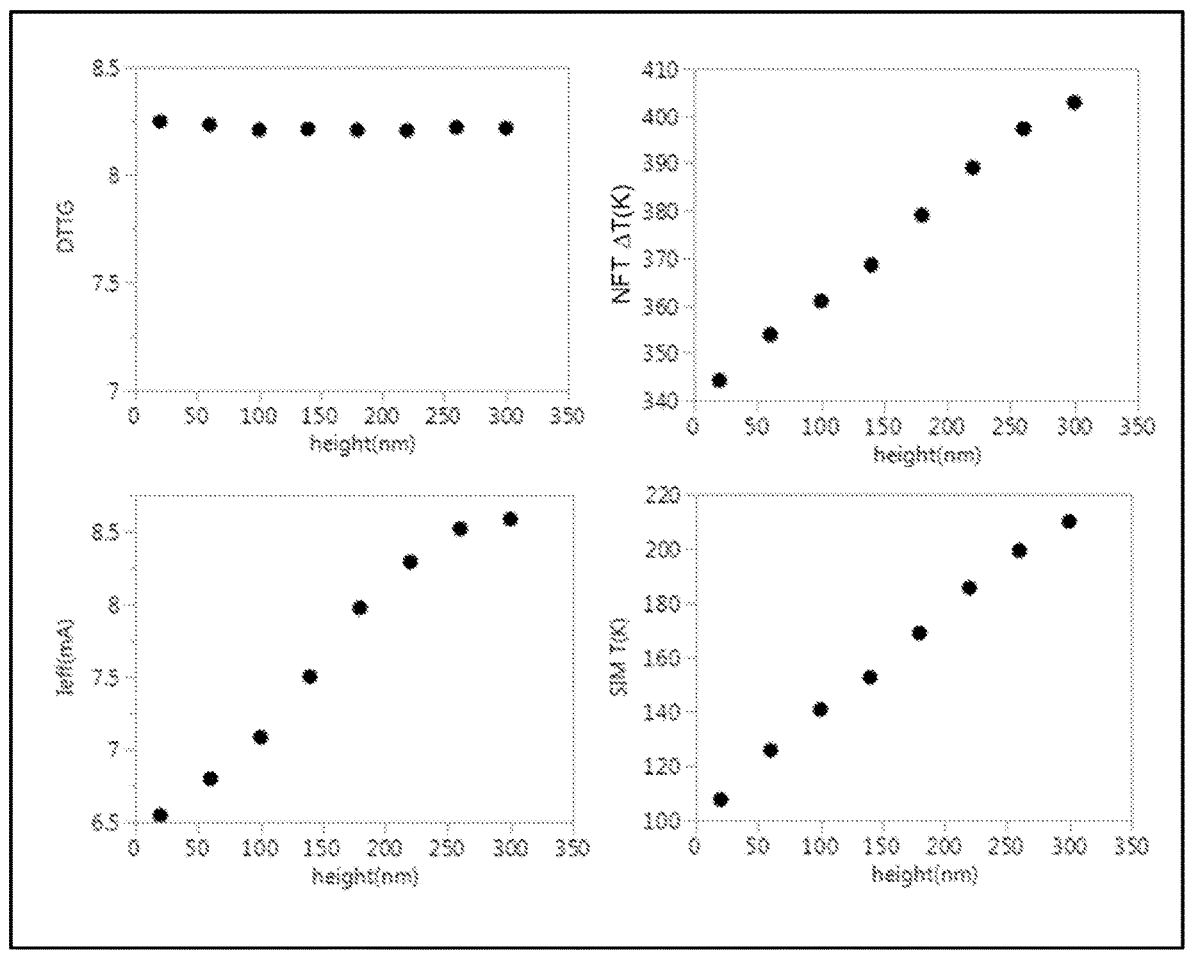

Another parameter that can affect performance of this and other embodiments is the height 900 of the second material 800b as it extends away from the media-facing surface as shown in FIG. 9. In FIGS. 10 and 11, a set of graphs show results of a simulation using various values of the height 900. Higher NFT and mirror temperatures are seen with larger height 900, and laser current will also increase with larger height 900. Thermal gradient is not particularly sensitive to the height 900. These height dimensions may also be used for embodiments with a liner as shown in FIGS. 4 and 5, as well as embodiments described below.

Figure 12:
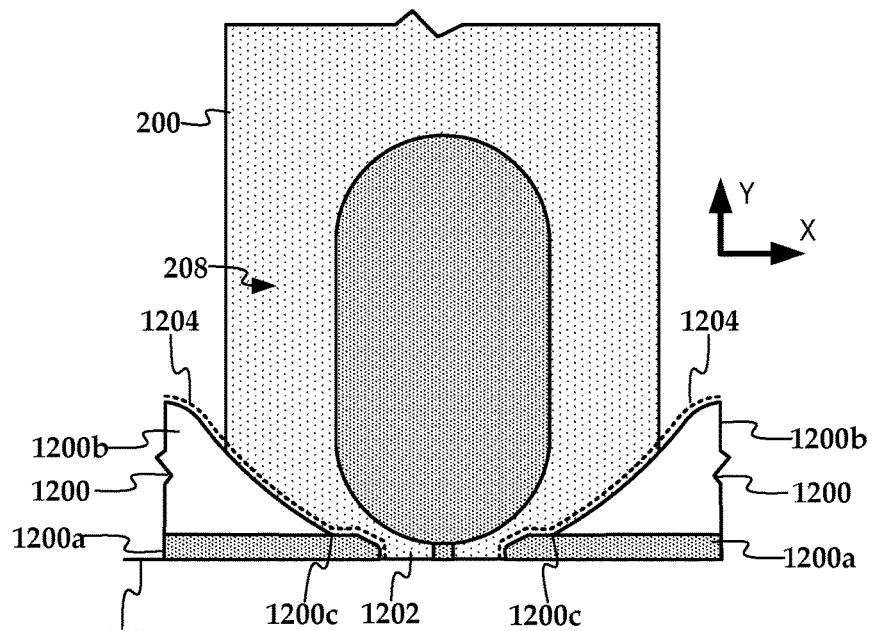
FIG. 12 is a plan view of a subwavelength mirror according to another example embodiment.

In FIG. 12, a diagram illustrates details of a subwavelength mirror according to another example embodiment. In this example, subwavelength focusing mirrors 1200 are at an end of the waveguide 200 proximate the media-facing surface 112 and separated from each other by a crosstrack gap 1202. Each of the subwavelength focusing mirrors 1200 includes a first material 1200a at the media-facing surface 112 and a second material 1200b facing away from the media facing surface and in contact with the first material 1200a. The first material 1200a is more mechanically robust than the second material 1200b, and may include any of the mechanically robust materials described above. Similarly, the second material 1200b may include any of the plasmonic materials described above.

In this embodiment, the first material 1200a protrudes into the gap 1202 further than the second material 1200b. This results in a discontinuity 1200c (e.g., a non-smooth transition) in edges of the mirrors that face the NFT 208. In this way, the protrusion of the first material 1200a acts as an optical side shield. By extending the first material 1200a this way, the gap 1202 can be decreased to less than 100 nm, or even less than 50 nm. As indicated by dashed lines 1204, a liner as shown in FIGS. 4 and 5 may optionally be used with this embodiment.

In FIGS. 13-17, perspective cutaway views show various optical side shield embodiments according to various embodiments. In each of these figures, side shields are extensions from first material parts 1300, 1400, 1500, 1600, 1700 of a mirror that is joined to a second material part 1300, the second material part being formed of any plasmonic materials as described above. For all of these embodiments, a recording head would include a mirror-image first and second material parts on an opposing crosstrack side of the NFT 208 separated by a gap 1304. The first material parts 1300, 1400, 1500, 1600, 1700 may be made from any robust, hard material as described above. All of these embodiments may be used with a liner as shown in FIGS. 4 and 5.

Figure 13:
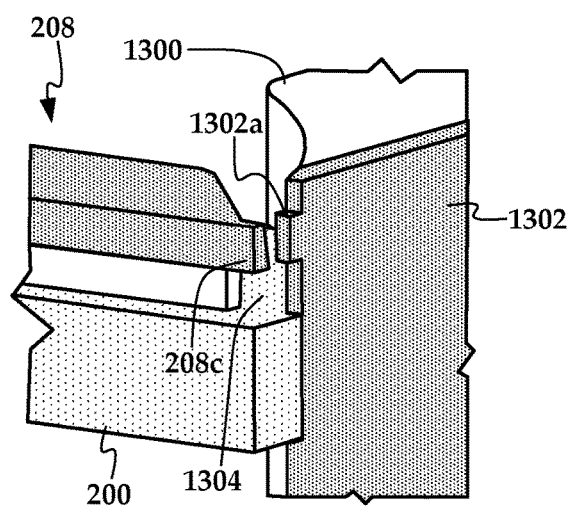
FIGS. 13-17 are perspective cutaway views of protrusions of a subwavelength mirror according to various example embodiments.
Figure 14:
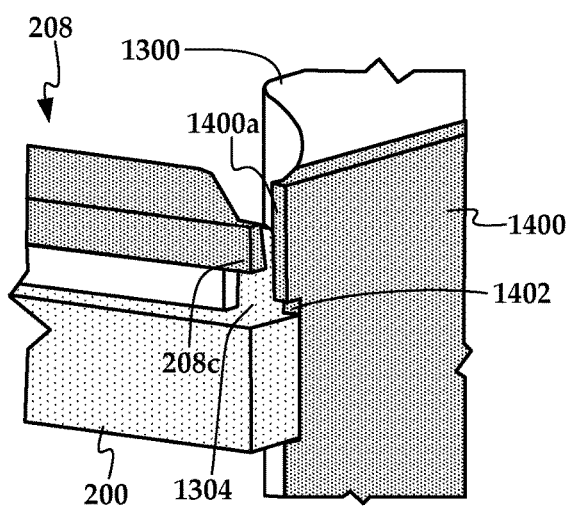

In FIG. 13, a first material part 1302 has a protrusion 1302a that extends into an inter-mirror gap 1304 in the crosstrack direction. The downtrack dimension of the protrusion 1302a matches that of the NFT peg 208c and is aligned with the peg 208c in the downtrack direction. In FIG. 14, a first material part 1400 has a protrusion 1400a that extends into the inter-mirror gap 1304. The downtrack dimension of the protrusion 1400a nearly matches that of the entire NFT 208 and is roughly aligned with the NFT 208 in the downtrack direction. The protrusion 1400a does not quite extend to the waveguide core 200 in the downtrack direction, as indicated by gap 1402.

Figure 15:
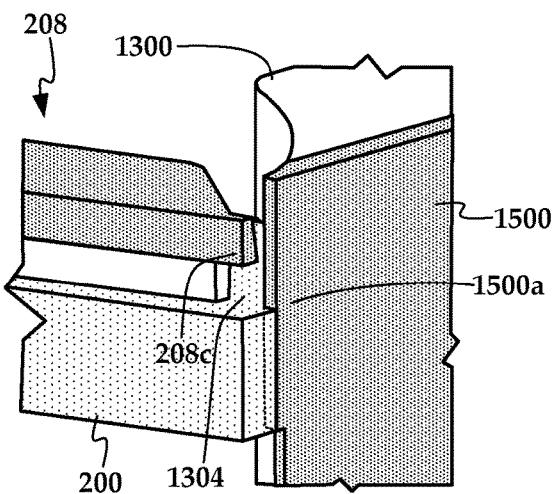
Figure 16:
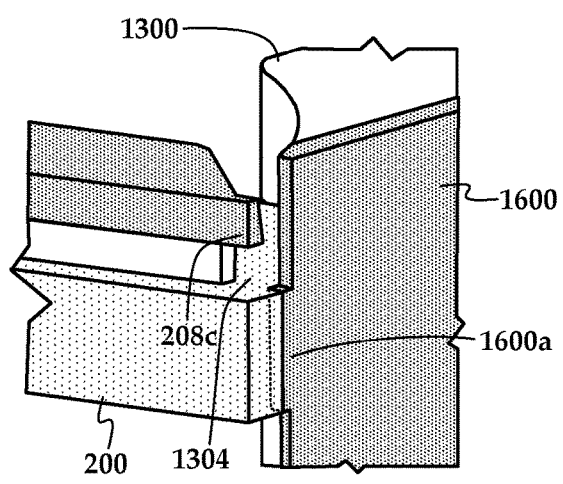
Figure 17:
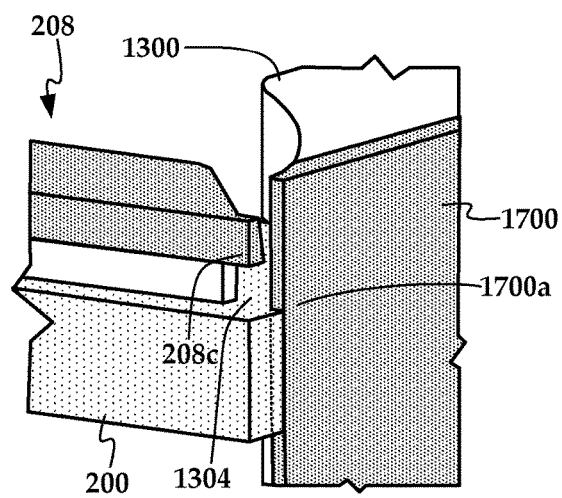

In FIG. 15, a first material part 1500 has a protrusion 1500a that extends into the inter-mirror gap 1304. The downtrack dimension of the protrusion 1500a matches that of both the NFT 208 and waveguide core 200, such that the protrusion extends into the waveguide core 200. In FIG. 16, a first material part 1600 has a protrusion 1600a that extends into the inter-mirror gap 1304. The downtrack dimension of the protrusion 1600a extends into and matches that the waveguide core 200 only, with which it is aligned in the downtrack direction. In FIG. 17, a first material part 1700 has a protrusion 1700a that extends into the inter-mirror gap 1704. The protrusion 1700a extends the full length of the mirror portion in the downtrack direction, matching a downtrack dimension of the first material part 1300.

Figure 18:
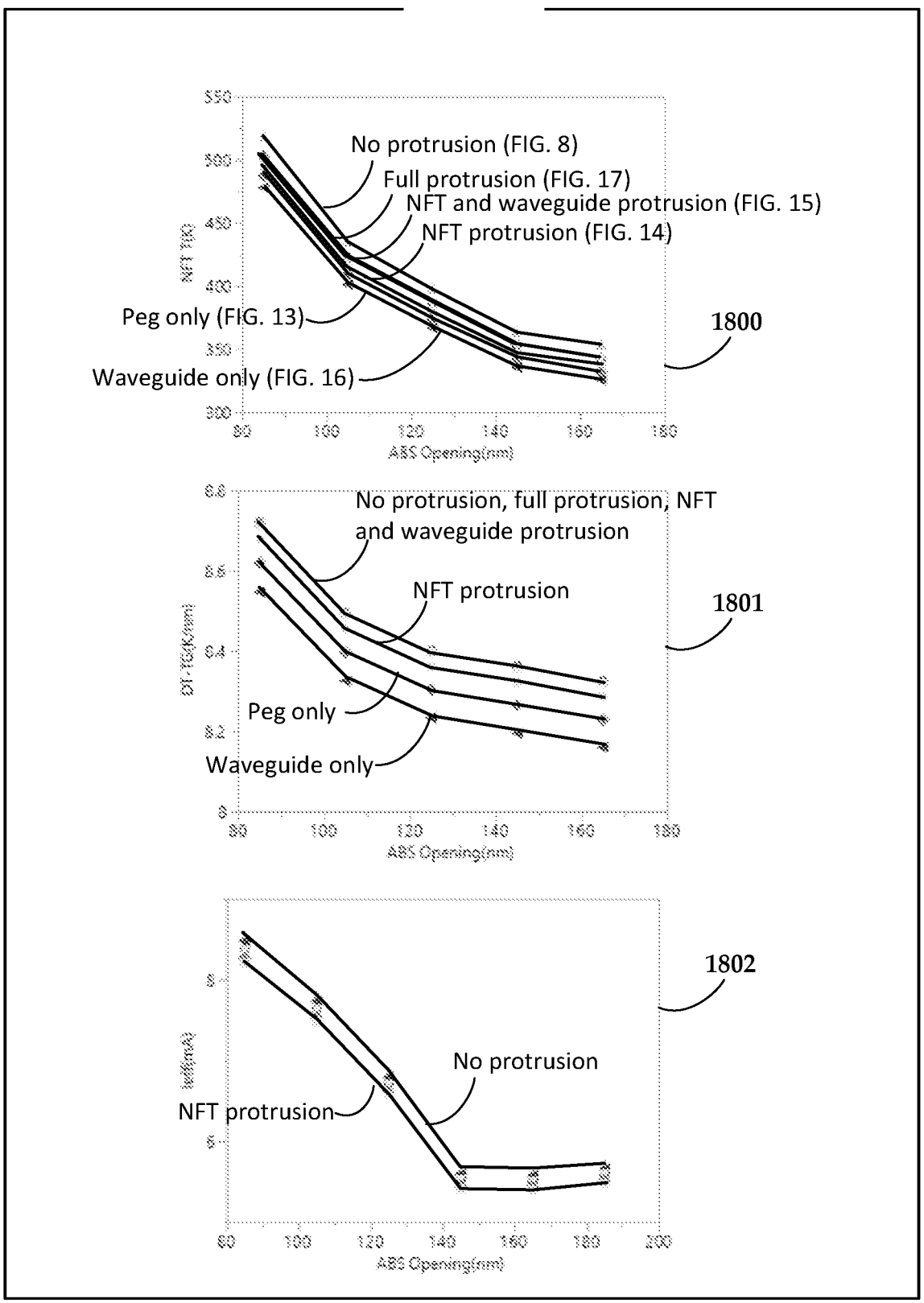
FIG. 18 is a set of graphs comparing performance of the subwavelength mirror embodiments shown in FIGS. 13-17.

In FIG. 18, graphs 1800-1802 show analyses of the different protrusion designs in FIGS. 13-17, as well as a non-protruding design as shown in FIG. 8. For these analyses, the NFT temperature, downtrack TG, and laser current were determined for different ABS opening sizes, which here refer to the minimum crosstrack distances between opposing protrusions on either side of the gap 1304. Note that in graph 1802, only the minimum and maximum current curves are labeled for purposes of maintaining clarity in the drawing. With design having a protrusion that matches the NFT sides and waveguide as shown in FIG. 15, TG is same as full protrusion shown in FIG. 17. The NFT Temperature can be 20-30 K lower with a protrusion that matches the NFT sides and waveguide as shown in FIG. 15.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A recording head comprising:
 a pair of subwavelength focusing mirrors proximate a media-facing surface of the recording head, the subwavelength focusing mirrors separated from each other by a crosstrack gap, the sub wavelength focusing mirrors each comprising:
  a first material at the media-facing surface comprising Rh; and
  a liner comprising Au or Al that contacts and covers the first material at a first edge of the subwavelength focusing mirror that faces the crosstrack gap and further covers a second edge of the subwavelength focusing mirror that faces away from and is parallel to the media-facing surface; and
 a near-field transducer proximate the media-facing surface in the crosstrack, the near-field transducer extending further away from the media-facing surface than the subwavelength focusing mirrors, the subwavelength focusing mirrors focusing waveguide light onto the near-field transducer.

2. The recording head of claim 1, wherein the crosstrack gap is less than 300 nm.

3. The recording head of claim 1, wherein each subwavelength focusing mirrors further comprises a second material stacked on the first material, the second material facing away from the media-facing surface, the liner covering the second material at the first and second edges of the subwavelength focusing mirror.

4. The recording head of claim 3, wherein the second material comprises one of Au, Ag, Cu, Al or their alloys.

5. The recording head of claim 3, wherein the first material protrudes further into the crosstrack gap than the second material.

6. The recording head of claim 5, wherein the protrusion of the first material into the crosstrack gap causes the subwavelength focusing mirrors to function as optical side shields.

7. The recording head of claim 1, wherein the liner is between iOnm and 25 nm thick.

8. The recording head of claim 1, wherein the near-field transducer comprises:
   an enlarged part having a first convex curved end facing the media-facing surface, a second convex curved end facing away from the media-facing surface, and linear sides that join the first and second convex curved ends; and
   a peg protruding from the first convex curved end towards the media-facing surface.

9. The recording head of claim 8, wherein the subwavelength focusing mirrors extend further from the media-facing surface than the first convex curved end of the near-field transducer.

10. The recording head of claim 8, wherein the first edge of each of the subwavelength focusing mirrors comprises a concave curve facing the first convex curved end of the near-field transducer.

11. The recording head of claim 1, further comprising a waveguide that extends to the media-facing surface and delivers the waveguide light to the near-field transducer and the subwavelength focusing mirrors.

12. The recording head of claim 11, wherein the waveguide comprising a three-dimensional, single mode channel waveguide.

13. The recording head of claim 11, wherein the waveguide is offset in a downtrack direction from the near-field transducer and the subwavelength focusing mirrors.

14. The recording head of claim 1, wherein the subwavelength focusing mirrors block background light.

15. A recording head comprising:
   a pair of subwavelength focusing mirrors proximate a media-facing surface of the recording head, the subwavelength focusing mirrors separated from each other by a crosstrack gap, the subwavelength focusing mirrors each comprising:
      a first material at the media-facing surface comprising Rh; and
      a liner comprising Au or Al that contacts and covers the first material at a first edge of the subwavelength focusing mirror that faces the crosstrack gap and further covers a second edge of the sub wavelength focusing mirror that faces away from and is parallel to the media-facing surface, the first edge having a concave curve;
   a near-field transducer proximate the media-facing surface in the crosstrack, the near-field transducer extending further away from the media-facing surface than the subwavelength focusing mirrors, the near-field transducer comprising:
      an enlarged part having a first convex curved end facing the first edges of the subwavelength focusing mirrors and a second convex curved end facing away from the media-facing surface; and
      a peg protruding from the first curved end towards the media-facing surface; and
   a channel waveguide that extends to the media-facing surface and delivers light to the near-field transducer and the subwavelength focusing mirrors.

16. The recording head of claim 15, wherein the channel waveguide comprising a three-dimensional, single mode channel waveguide.

17. The recording head of claim 15, wherein the liner is between 10 nm and 25 nm thick.

18. The recording head of claim 15, wherein the subwavelength focusing mirrors extend further from the media-facing surface than the first convex curved end of the near-field transducer.

19. The recording head of claim 1, wherein the liner contacts and covers the first material at the second edge of the subwavelength focusing mirror.

20. The recording head of claim 15, wherein the liner contacts and covers the first material at the second edge of the subwavelength focusing mirror.

* * * * *